2,778,821
Patented Jan. 22, 1957

2,778,821
PRODUCTION OF COMPOUNDS OF THE PYRIMIDINE SERIES

Heinrich Pasedach, Ludwigshafen (Rhine), and Matthias Seefelder, Ludwigshafen (Rhine)-Oppau, Germany, assignors to Badische Anilin- & Soda-Fabrik Aktiengesellschaft, Ludwigshafen (Rhine), Germany No Drawing. Application January 17, 1955,
Serial No. 482,494

Claims priority, application Germany January 19, 1954

8 Claims. (Cl. 260—239.75)

This invention relates to an improved process for the production of compounds of the pyrimidine series.

It is already known that pyrimidine derivatives, in particular 2-aminopyrimidines, can be obtained by reaction of guanidine with acetlyene ketones or aldehydes. The yields of pyrimidine compounds by these methods are unsatisfactory, however, by reason of the small stability of acetylene ketones and acetylene aldehydes.

We have now found that compounds of the pyrimidine series can be obtained in excellent yields by reacting the addition products obtainable by adding on one molecule of ammonia or of a primary or secondary amine to one molecule of an alpha-acetylene aldehyde or acetylene ketone with compounds of the general formula

or their salts. In the said formula, R represents hydrogen or an alkyl, aryl, hydroxyl or sulfhydryl group or an amino group which can be free or substituted by alkyl, aryl, acyl or sulfonyl radicals.

Among alpha-acetylene aldehydes or ketones, of which the amine addition products are suitable for the said process, there may be mentioned for example propargyl aldehyde, butine-(1)-one-(3), pentine-(2)-one-(4), 3-phenyl-propine-(1)-one-(3), 1-phenyl-butine-(1)-one-(3) and heptine-(2)-al-(1).

Suitable amines for being added on to the acetylene aldehydes or ketones are for example ammonia, primary and preferably secondary amines, such as diethylamine, dimethylamine, pyrrolidine, piperidine, methylaniline and ethylaniline. These addition products are stable compounds often capable of being distilled in vacuo, to which the following structure is probably ascribable:

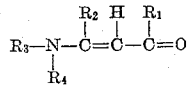

in which $R_1$, $R_2$, $R_3$ and $R_4$ may be hydrogen or alkyl or aryl groups.

As suitable compounds of the formula

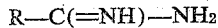

there may be mentioned for example guanidine (preferably in the form of its salts, such as guanidine carbonate, sulfate and nitrate), para-aminobenzene-sulfonylguanidine, para-acetamino-benzene-sulfonylguanidine, urea, thiourea, benzamidine, acetamidine and formamidine.

The reaction of these compounds with the addition products of amines and alpha-acetylene ketones or aldehydes can be effected with or without the use of condensing agents, such as alkali metal hydroxides, alkali metal alcoholates, alkali metal amides, or sulfuric acid, and in the presence or absence of solvents, such as alcohols, water, glacial acetic acid, benzene and the like. It is often preferable to work at raised temperature, as for example at 50° C. to 150° C., but in some cases the reaction proceeds already at ordinary temperature.

The following examples will further illustrate this invention but the invention is not limited to these examples. The parts are parts by weight.

Example 1

127 parts of the addition product of 1 mol of diethylamine to 1 mol of propargyl aldehyde (probably=beta-diethylaminoacroleine, boiling point at 13 torr=160° C. to 165° C.) are added to a suspension of 75 parts of sodium methylate and 113 parts of guanidine carbonate in 400 parts of absolute alcohol, the mixture then being heated under reflux for 5 hours. While still hot it is then filtered off by suction from the precipitate and the latter washed with absolute alcohol. The filtrate is concentrated and 2-aminopyrimidine of the melting point 127° C. to 128° C. thereby obtained in a quantitative yield.

Example 2

141 parts of the addition product of diethylamine and butine-(1)-one-(3) (boiling point at 6 torr=130° C.) are reacted as described in Example 1 with 81 parts of sodium methylate and 125 parts of guanidine carbonate. A quantitative yield of 2-amino-4-methylpyrimidine of the melting point 158° C. is obtained.

Example 3

107 parts of para-aminobenzene-sulfonylguanidine and 70 parts of the addition product of diethylamine and propargyl aldehyde specified in Example 1 are heated to boiling in 500 parts of butanol for 5 hours while stirring, the water formed being removed continuously. It is allowed to cool while stirring and the precipitate which has separated is filtered off by suction. 130 parts of a crude product are thus obtained from which pure 2-(para-aminobenzene-sulfonamido)-pyrimidine can be obtained readily and in good yields, for example by recrystallization.

Example 4

61 parts of benzamidine hydrochloride and 40 parts of the addition product of diethylamine and propargyl aldehyde are added to a suspension of 21 parts of sodium methylate in 200 parts of absolute alcohol. The mixture is boiled for 8 hours under reflux, the alcohol distilled off and the residue distilled with steam. From the aqueous distillate there separates on cooling 2-phenylpyrimidine in crystalline form. A further quantity is obtained by extracting the aqueous mother liquor with ether. The total yield amounts to 33 parts of 2-phenylpyrimidine of the melting point 39° C.

Example 5

530 parts of thiourea are suspended in a solution of 380 parts of sodium methylate in 2800 parts of methanol, then 1240 parts of beta-diethylamino-acrolein (see Example 1) are rapidly introduced and the whole stirred at room temperature for about 24 hours. After this time a great part of the sodium salt of 2-mercaptopyrimidine formed has separated in the form of fine colorless needles. It is filtered off by suction and a further quantity obtained from the filtrate by concentration and cooling. After washing with acetone and drying, the yield amounts to about 890 parts, i. e. 85% of the theoretical yield.

By dissolving in water and neutralizing with acetic acid, the free 2-mercaptopyrimidine is obtained therefrom in the form of deep yellow crystals of the melting point 221° C.

From the combined mother liquors of the sodium salt, a further 85 parts of 2-mercaptopyrimidine can be recovered by means of acetic acid, so that the total yield amounts to about 93% of the theoretical yield.

Example 6

56 parts of powdered caustic soda and 135 parts of guanidine sulfate are suspended in 400 parts of methanol. 159 parts of beta-diethylamino-acrolein (see Example 1) are introduced and the mixture heated to boiling under reflux for 10 hours. It is then filtered off by suction from deposited sodium sulfate and the methanol is distilled off from the filtrate. The residue is dissolved in methylene chloride. After distilling off this solvent, 100 parts of 2-aminopyrimidine are obtained.

*Example 7*

175 parts of the addition product of N-methylaniline and butine-(1)-one-(3) (boiling point at 3 torr=144° C. to 145° C.) are dissolved in 400 parts of methanol, then 135 parts of guanidine sulfate and 55 parts of sodium methylate are added and the mixture boiled under reflux for 15 hours. While still hot the deposited sodium sulfate is filtered off by suction and the methanol distilled off from the filtrate. The residue is extracted 6 times, each time with 100 parts of hot water. Traces of methylaniline are distilled off from the combined extracts with steam and the aqueous residue exhaustively extracted with methylene chloride. After distilling off this solvent, 80 parts of 2-amino-4-methyl-pyrimidine of the melting point 157° C. are obtained.

*Example 8*

161 parts of the addition product of N-methylaniline and propargyl aldehyde (boiling point at 3 torr=170° C.) are reacted in the manner described in Example 7 with 135 parts of guanidine sulfate and 76 parts of sodium methylate in 400 parts of methanol. The mixture is worked up in the same way. 85 parts of 2-aminopyrimidine are obtained.

*Example 9*

94 parts of the addition product of piperidine and 3-phenylpropine-(1)-one-(3) are dissolved in 250 parts of methanol, then 56 parts of guanidine sulfate, and 32 parts of sodium methylate are added and the mixture boiled for 15 hours under reflux. While still hot, the separated sodium sulfate is filtered off by suction. By cooling, 25 parts of 2-amino-4-phenyl-pyrimidine crystallize out from the filtrate. A further 31 parts are obtained from the mother liquor. The compound melts at 165° C. after recrystallization from methanol.

*Example 10*

108 parts of guanidine sulfate are suspended in 200 parts of concentrated sulfuric acid. Then while stirring at room temperature, 127 parts of beta-diethylamino-acrolein (see Example 1) are allowed to drip in, the mixture then being heated at 100° C. for 8 hours. After cooling it is diluted with 500 parts of water and rendered alkaline with concentrated caustic soda solution. 40 parts of 2-amino-pyrimidine are obtained from the upper layer by distillation.

*Example 11*

Into a suspension of 55 parts of sodium amide and 90 parts of thiourea in 400 parts of dry benzene there are introduced 127 parts of the addition product of diethylamine and propargyl-aldehyde. The mixture is then boiled for 10 hours under reflux. After cooling, the bottoms are taken up with water and stripped of the benzene layer, the latter then being extracted twice with water. The aqueous solutions are combined and neutralized with acid. The yellow precipitate thus obtained is then nutched and washed with water. After drying 95 parts of crude 2-mercaptopyrimidine of a melting point of 218° C. are obtained, i. e. 85% of the calculated amount.

*Example 12*

214 parts of p-aminobenzenesulfonylguanidine, 54 parts of sodium methylate and 185 parts of the addition product of N-methylaniline and butine-(1)-one-(3) (cf. Example 7) are heated under reflux for 8 hours together with 800 parts of methanol. The deposit is filtered off by suction after cooling and the filter cake is washed with methanol and dissolved then in water. The aqueous solution is adjusted to a pH of 6, filtered off by suction and the bottoms are dried at 70° C. in vacuo. There are obtained 140 parts of 2-(p-aminobenzene sulfonylamido)-4-methylpyrimidine having a melting point of 232° C.

From the methanolic mother liquor 45 parts of p-aminobenzene sulfoguanidine are recovered.

We claim:

1. An improved process for the production of compounds of the pyrimidine series which comprises reacting at from ordinary temperature up to about 150° C. a compound of the general formula

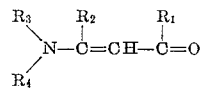

in which $R_1$ and $R_2$ represent members of the group consisting of hydrogen, methyl and phenyl radicals and $R_3$—N—$R_4$ represents the amino radical of a secondary amine selected from the group consisting of saturated lower aliphatic secondary amines, pyrrolidine, piperidine and N-lower alkyl anilines, with a compound of the general formula

in which R represents a member of the group consisting of hydrogen, lower alkyl, phenyl, amino, sulfhydryl, benzene-sulfonylamino and para-aminobenzene sulfonylamino groups.

2. An improved process for the production of compounds of the pyrimidine series which comprises reacting at from ordinary temperature up to about 150° C. and in the presence of condensing agents selected from the group consisting of alkali metal hydroxides, lower alcoholates and amides and concentrated sulfuric acid a compound of the general formula

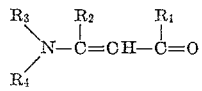

in which $R_1$ and $R_2$ represent members of the group consisting of hydrogen, methyl and phenyl radicals and $R_3$—N—$R_4$ represents the amino radical of a secondary amine selected from the group consisting of saturated lower aliphatic secondary amines, pyrrolidine, piperidine and N-lower alkyl analines, with a compound of the general formula

in which R represents a member of the group consisting of hydrogen, lower alkyl, phenyl, amino, sulfhydryl, benzene-sulfonylamino and para-aminobenzenesulfonylamino groups.

3. An improved process for the production of compounds of the pyrimidine series which comprises heating under reflux a mixture of a lower saturated alcohol, a compound of the general formula

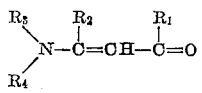

in which $R_1$ and $R_2$ represent members of the group consisting of hydrogen, methyl and phenyl radicals and $R_3$—N—$R_4$ represents the amino radical of a secondary amine selected from the group consisting of saturated lower aliphatic secondary amines, pyrrolidine, piperidine and N-lower alkyl anilines, and about an equivalent amount of a compound of the general formula

in which R represents a member of the group consisting of hydrogen, lower alkyl, phenyl, amino, sulfhydryl, benzene-sulfonylamino and para-aminobenzenesulfonylamino groups.

4. An improved process for the production of 2-aminopyrimidine which comprises introducing beta-N,N diethylaminoacroleine into a mixture of a lower aliphatic alcohol, guanidine carbonate and an alkali metal lower alcoholate and boiling under reflux.

5. An improved process for the production of 2-mercapto pyrimidine which comprises introducing beta-N,N-diethylamino acroleine into a mixture of a lower aliphatic alcohol, thiourea and sodium methylate.

6. An improved process for the production of 2-amino-4-methylpyrimidine which comprises in adding about equivalent amounts of guanidine sulfate and sodium methylate to a methanolic solution of beta-(N,N-diethylamino) vinyl methyl ketone and boiling the mixture under reflux.

7. An improved process for the production of 2-(para-aminobenzene-sulfonamido-) pyrimidine which comprises boiling, while continuously removing the water vapours formed, a mixture of butanol, para-aminobenzene-sulfonyl guanidine and beta-N,N-diethylamino acroleine.

8. An improved process for the production of 2-(para-aminobenzene-sulfonylamido)-4-methyl pyrimidine which comprises in boiling under reflux, a mixture of methanol, para-amino-benzene-sulfonyl guanidine, sodium methylate and beta-(N-methyl-N-phenylamino)-vinylmethyl ketone.

References Cited in the file of this patent

UNITED STATES PATENTS

| | | |
|---|---|---|
| 2,435,002 | Hartmann et al. | Jan. 27, 1948 |
| 2,686,681 | Hitchings et al. | Aug. 17, 1954 |

FOREIGN PATENTS

| | | |
|---|---|---|
| 78,274 | Norway | Mar. 19, 1951 |
| 489,073 | Canada | Dec. 23, 1952 |
| 609,571 | Great Britain | Oct. 4, 1948 |
| 889,445 | Germany | Sept. 10, 1953 |

OTHER REFERENCES

Chem. Abstracts, 1951, vol. 45, col. 8536–F (abstract of Ishikawa et al.; Journal of the Pharm. Society of Japan, 71:8–81 (1951)).